(12) United States Patent
Márquez

(10) Patent No.: US 11,651,564 B2
(45) Date of Patent: May 16, 2023

(54) SYSTEM AND METHOD FOR VIRTUAL FITTING OF GARMENTS OVER A COMMUNICATIONS NETWORK

(71) Applicant: Tailr LLC, Middletown, DE (US)

(72) Inventor: José Antonio Márquez, Middletown, DE (US)

(73) Assignee: Tailr LLC, Middletown, DE (US)

( * ) Notice: Subject to any disclaimer, the term of this patent is extended or adjusted under 35 U.S.C. 154(b) by 25 days.

(21) Appl. No.: 17/348,373

(22) Filed: Jun. 15, 2021

(65) Prior Publication Data

US 2022/0398813 A1    Dec. 15, 2022

(51) Int. Cl.
*G06T 19/00* (2011.01)
*H04L 67/125* (2022.01)
*G06T 19/20* (2011.01)
*G06Q 30/0601* (2023.01)

(52) U.S. Cl.
CPC ....... *G06T 19/006* (2013.01); *G06Q 30/0643* (2013.01); *G06T 19/20* (2013.01); *H04L 67/125* (2013.01); *G06T 2200/24* (2013.01); *G06T 2210/16* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 6,307,568 B1 | 10/2001 | Rom | |
| 7,039,486 B2 | 5/2006 | Wang | |
| 7,479,956 B2 | 1/2009 | Shaw-Weeks | |
| 7,522,165 B2 | 4/2009 | Weaver | |
| 8,823,775 B2 | 9/2014 | Xu et al. | |
| 9,607,419 B2 | 3/2017 | Kim et al. | |
| 9,696,130 B1* | 7/2017 | Eakins | G01B 21/20 |
| 10,096,141 B2* | 10/2018 | Zylberberg | F16M 11/041 |
| 10,395,425 B2* | 8/2019 | Kim | G06T 19/00 |
| 10,460,525 B1* | 10/2019 | Buuck | G01F 17/00 |
| 10,664,903 B1* | 5/2020 | Haitani | G06F 21/31 |
| 10,867,453 B2 | 12/2020 | Chen et al. | |
| 2011/0298897 A1 | 12/2011 | Sareen | |
| 2013/0238285 A1* | 9/2013 | Volchek | A41H 5/01 |
| | | | 702/188 |
| 2019/0236222 A1* | 8/2019 | Allen | G06F 1/163 |

* cited by examiner

*Primary Examiner* — Ryan M Gray
(74) *Attorney, Agent, or Firm* — Mark Terry (57) ABSTRACT

A system and method for facilitating virtual garment fitting includes a client module for executing a three-dimensional (3D) scan of a user's body, generating a 3D model of the user's body, and transmitting the 3D model to a web server, receiving and viewing a virtual fitting that shows a particular garment on a physical life-size model based on the 3D model, wherein the system also includes an adjustable life-size model of human bodies and a web server module for receiving the 3D model of the user's body, interfacing with the adjustable life-size model and adjusting the physical life-size model based on the 3D model, generating a virtual fitting that shows a particular garment on the physical life-size model based on the 3D model and transmitting the virtual fitting to the client module over a communications network.

20 Claims, 4 Drawing Sheets

SYSTEM AND METHOD FOR VIRTUAL FITTING OF GARMENTS OVER A COMMUNICATIONS NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of electronic commerce and, more specifically, the claimed subject matter relates to the field of virtual fitting of garments over a communications network.

BACKGROUND

U.S. e-commerce sales were in the hundreds of billions of dollars in the start of this decade, according to the U.S. Department of Commerce. Further, the online apparel and accessories market in the United States has seen significant growth over the last decade, with total e-commerce sales in the market amounting to over 100 billion USD in 2019, according to the U.S. Department of Commerce. Despite seemingly impressive sales, e-commerce only makes up for an estimated 20-25% of most fashion retailers' sales. In addition, an estimated 63% of these e-commerce sales are returned, compared to only 9% of in-store purchases.

Many sources claim the relatively low percentage of e-commerce sales and high return rate on online purchases is due to the uncertainty regarding size, style, and fit a customer may face when attempting to purchase clothing online. This uncertainty is further exacerbated when a customer is purchasing a new style of apparel or from a new brand. Studies show that in most cases, customers are more likely to purchase when they have either been able to view and size-up a product in person or try the product on before making the purchase. To alleviate some of the burden and increase online sales, many online retailers have attempted to integrate systems into their online marketplaces that allow customers to better determine the appropriate size or fit of a product. Most of these systems require that customers upload photos of themselves in a specific position to allow the merchant's software to layer a 2D image of the clothing over the customer's photo. The idea is that this allows the customer to get an idea of how the article of clothing would look when worn. While this may slightly alleviate some of the customer's concerns, the static image of an article of clothing layered over a photo of the customer does not take into account the customer's unique measurements and as a result fails to provide the customer with a valuable idea of how the article of clothing may actually fit on their body. In addition, many of these systems only permit the layering of one article of clothing at a time, preventing the customer from matching articles of clothing and assembling entire outfits Because it is difficult to tell whether an item of clothing will fit without trying it on, allowing a customer to change into an item of clothing before purchase allows the consumer to make better purchasing decisions. One of the problems with using the Internet to purchase clothing, for example, is that the Internet does not allow a consumer to try on an item of clothing before purchase. This leads to returns and increased expenses in shipping and re-stocking of goods.

Another problem with purchasing clothing online is that the consumer may not know his size and therefore may be required to guess his size. In addition, a consumer may only be provided with static images of the clothing, or images of the clothing or accessories on models selected by the retailer. In particular, there is no easy way for the user to see what an article of clothing will look like on the consumer's own body. Additionally, many clothing sizes are not standard, and consumers do not know which clothing runs bog or small. Consumers are expected to learn what their sizes are in the array of international sizes used for clothing, for example U.S. vs. Italy vs. UK vs. France vs. Japan, which all have different scales.

While other systems exist to allow customers to enter their measurements and try on apparel virtually, these systems come with their own unique shortfalls that do not fully accommodate the customer. In most cases, these systems require that the customer not only measure their own body, but also measure or find the measurements for the article of clothing they are considering purchasing. In the frequent case that the customer is unable to obtain the exact measurements of the article they are looking to purchase, they are encouraged to use a currently owned item as reference. A further issue involves garments having different elastic properties, which cannot be solved using static overlays in a virtual fitting. While these systems do have the potential to slightly alleviate the burden on the customer looking to purchase online, they place new burdens on the customer and rely on potentially inaccurate estimations to provide equally as uncertain results.

A further issue involves hygiene, which is particularly true for undergarments and swimwear. There is a serious health and hygiene issues associated with trying on clothing that has been tried on by other people.

In light of the aforementioned shortcomings, a need exists for an improvement over the prior art. Specifically, a need exists for a more efficient and accurate method and system for realistic virtual apparel fitting to bolster the online shopping experience and accommodate the needs of the customer purchasing clothing online.

BRIEF SUMMARY

In one embodiment, a system for facilitating virtual garment fitting is disclosed, the system comprising: a) a client module executing on a client computing device communicably connected to a communications network, the client module configured for: 1) executing a three-dimensional (3D) scan of a user's body, generating a 3D model of the user's body, and transmitting the 3D model to a web server over the communications network; and 2) receiving and viewing a virtual fitting from the server over the communications network, wherein the virtual fitting shows a particular garment on a physical life-size model based on the 3D model; b) the physical life-size model being an adjustable model configured to emulate a variety of human body sizes and shapes; c) a web server module executing on the web server communicably connected to the communications network, the web server module configured for: 1) receiving the 3D model of the user's body over the communications network; 2) interfacing with the physical life-size model and adjusting the physical life-size model based on the 3D model; 3) placing the particular garment on the physical life-size model that has been adjusted; 4) generating a virtual fitting that shows the particular garment on the physical life-size model that has been adjusted; and 5) transmitting the virtual fitting to the client module over the communications network The method for facilitating virtual garment fitting, includes 1) executing, on a client module executing on a client computing device communicably connected to a communications network, a three-dimensional (3D) scan of a user's body; 2) generating, by the client module, a 3D model of the user's body; 3) transmitting, by the client module, the 3D model to a web server over the communications network; 4) receiving and viewing, by the client module over the communications network, a virtual fitting from the server, wherein the virtual fitting shows a particular garment on a physical life-size model based on the 3D model; 5) receiving, by a web server module executing on the web server communicably connected to the communications network, the 3D model of the user's body; 6) interfacing, by the web server module, with an adjustable physical life-size model and adjusting the physical life-size model based on the 3D model, wherein the physical life-size model being configured to emulate a variety of human body sizes and shapes; 7) placing the particular garment on the physical life-size model that has been adjusted; 8) generating, by the web server module, a virtual fitting that shows the particular garment on the physical life-size model based on the 3D model; and 9) transmitting, by the web server module over the communications network, the virtual fitting to the client module.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

The following detailed description refers to the accompanying drawings. Wherever possible, the same reference numbers are used in the drawings and the following description to refer to the same or similar elements. While the claimed embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed embodiments. Instead, the proper scope of the claimed embodiments is defined by the appended claims.

The claimed embodiments improve over the prior art by allowing a consumer shopping online to determine whether an item of clothing will fit without physically trying it on before purchase, thereby allowing the consumer to make better purchasing decisions. One of the resulting advantages is fewer returns from consumers and lowered expenses related to shipping and re-stocking of goods. The claimed embodiments further improve over the prior art by eliminating the need for a consumer to know his size, since the consumer's size is defined in an automated fashion. In addition, a consumer is provided with dynamic, three-dimensional images of the actual garment on a life-size model of the consumer, thereby allowing better review of the clothing before purchase. Also, the claimed embodiments improve of the prior art by allowing a user to see what an article of clothing will look like on the consumer's own body before purchase. Further, the claimed embodiments improve over the prior art by eliminating the need that a consumer is located in the same place as the garment in order to determine whether the garment will fit on the consumer. The claimed embodiments further improve over the prior art by eliminating the need for a consumer to try on clothing that has been tried on by others, thereby addressing the hygiene issue.

Figure 1:
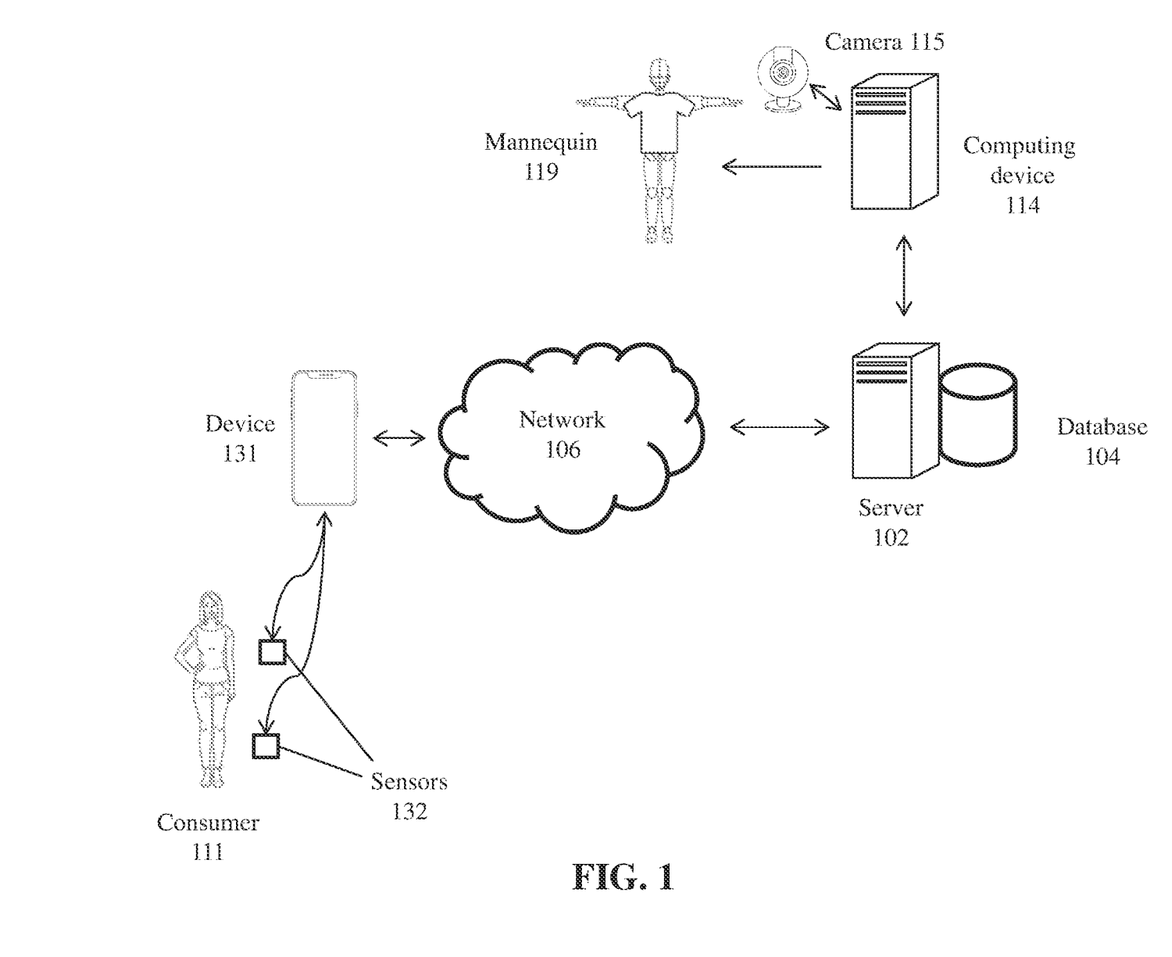
FIG. 1 is a block diagram illustrating the network architecture of a system for facilitating virtual garment fitting over a communications network, in accordance with one embodiment.

Referring now to the drawing figures in which like reference designators refer to like elements, there is shown in FIG. 1 an illustration of a block diagram showing the network architecture of a system 100 and method for facilitating virtual garment fitting over a communications network in accordance with one embodiment. A prominent element of FIG. 1 is the server 102 associated with repository or database 104 and further communicatively coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, facilitating virtual garment fitting.

FIG. 1 includes mobile computing device 131, which may be smart phones, mobile phones, tablet computers, handheld computers, laptops, or the like. In another embodiment, mobile computing device 131 may be one or more workstations, desktop computers, servers, laptops, all-in-one computers, or the like. In another embodiment, mobile computing device 131 may be one or more AR or VR systems that may include display screens, headsets, heads up displays, helmet mounted display screens, tracking devices, tracking lighthouses or the like. Mobile computing device 131 corresponds to a consumer 111 that wants to determine if an article of clothing fits the consumer's body. Device 131 may be communicatively coupled with network 106 in a wired or wireless fashion. Augmented reality (AR) adds digital elements to a live view often by using a camera on a computing device. Virtual reality (VR) is a complete or near complete immersion experience that replaces the physical world.

The input device may be configured to scan and read, such as using LIDAR, i.e., a 3D scanning device or radar device for scanning and reading.

FIG. 1 further shows that server 102 includes a database or repository 104, which may be a relational database comprising a Structured Query Language (SQL) database stored in a SQL server. Device 131 may also each include its own database. The repository 104 serves data from a database, which is a repository for data used by server 102 and device 131 during the course of operation of the disclosed embodiments. Database 104 may be distributed over one or more nodes or locations that are connected via network 106.

The database 104 may include a user record for each user 111. A user record may include: contact/identifying information for the user (name, address, telephone number(s), email address, etc.), information pertaining to body measurements associated with the user (height, neck, bust, waist, hips, arm length, shoulder length, leg length, skin color, etc.), etc. A user record may also include a unique identifier for each user, a residential address for each user, the current location of each user (based on location-based services from the user's mobile computer) and a description of past garments fitted by each user. A user record may further include demographic data for each user, such as age, sex, income data, race, color, marital status, etc.

The database 104 may include a virtual fitting record for each virtual fitting. A virtual fitting may comprise: i) a 3D model of a mannequin representing the user's body having the garment placed on said mannequin, ii) a video of the mannequin representing the user's body having the garment placed on said mannequin, and/or iii) an AR/VR file of the mannequin representing the user's body having the garment placed on said mannequin. A 3D model is a mathematical representation of a physical object or objects in three dimensions using a collection of points in 3D space, connected by various geometric entities such as triangles, lines, curved surfaces, etc. A 3D model may be displayed as a two-dimensional image on a display screen through a process called 3D rendering. The set of actions that may be performed on the 3D model include viewing the 3D model in two dimensions (3D rendering), rotating the 3D model, resizing the 3D model, manipulating the 3D model, changing the color or other characteristics of the 3D model, changing the viewer's perspective in relation to the 3D model, etc. The set of actions may include interactive manipulation of the 3D model via a display screen on a client computing device, such as those defined above. The set of actions that may be performed on the 3D model may be performed by the device of the user, which may be a VR or AR system.

The set of actions that may be performed on the 3D model may also include engaging in an action that involves the 3D model, such as moving the garment in the 3D model, viewing the 3D model in an environment that represents where the garment will be worn, or viewing the 3D model in a location related to the garment, such as a store. Another action may be watching the garment actually being donned by the mannequin. The set of actions that may be performed on the 3D model may be performed by the VR or AR system of the user.

A virtual fitting record may include the 3D model of the user's body donning the garment or garments, the set of actions that may be performed on the 3D model, and an identifier for the garment or garments. A virtual fitting record may also include: a unique identifier, contact/identifying information for the seller of the garment or garments, a description of the garment or garments, an amount of money that represents the costs of the garment or garments, retail outlet information (such as address, phone number, web site, etc.), date and time data, etc. A virtual fitting is defined as a representation of the corresponding virtual fitting record, which may reside on a mobile computing device of a user or the server or database. In one embodiment, a virtual fitting is a file or other data structure which may reside on the mobile device of a user, the server or the database, wherein, when opened or activated, displays data of a virtual fitting record.

FIG. 1 shows an embodiment wherein networked computing device 131 interacts with server 102 and repository 104 over the network 106. It should be noted that although FIG. 1 shows only the networked computers 131 and 102, the system of the disclosed embodiments supports any number of networked computing devices connected via network 106. Further, server 102, and unit 131 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 131, 190. Further, server 102 and its functionality, according to a preferred embodiment, can be realized in a centralized fashion in one computer system or in a distributed fashion wherein different elements are spread across several interconnected computer systems.

FIG. 1 further includes an adjustable, physical life-size mannequin 119 configured to be adjusted to emulate a life-size model of the human body in a variety of human shapes and sizes, up to about 2 meters in length. The mannequin 119 may be configured for taking a human form, i.e., a form that emulates a human body in different sizes and shapes. Specifically, the adjustable, physical life-size mannequin 119 is configured to be adjusted to emulate a life-size model of the human body according to certain specifications that are defined by a particular 3D model of a human body. The mannequin 119 may include limbs, for example, that may be adjusted in size or length using telescoping parts that include a distal end of a limb that slides into and out of a proximal part of a limb, so as to adjust the length of the limb. The mannequin 119 may include a torso, for example, that may be adjusted in size or length using telescoping parts that include a center portion that slides into and out of side portions of the torso, so as to adjust the size or length of the torso. The mannequin 119 may be solid, hollow or may comprise an exoskeleton that approximates a human body in size and shape. Computing device 114 is configured to interface with, and adjust, mannequin 119 according to certain specifications, such as a 3D model of the body of user 111. Computing device 114 is configured to adjust mannequin 119 to emulate the 3D model of the body of user 111.

Figure 2:
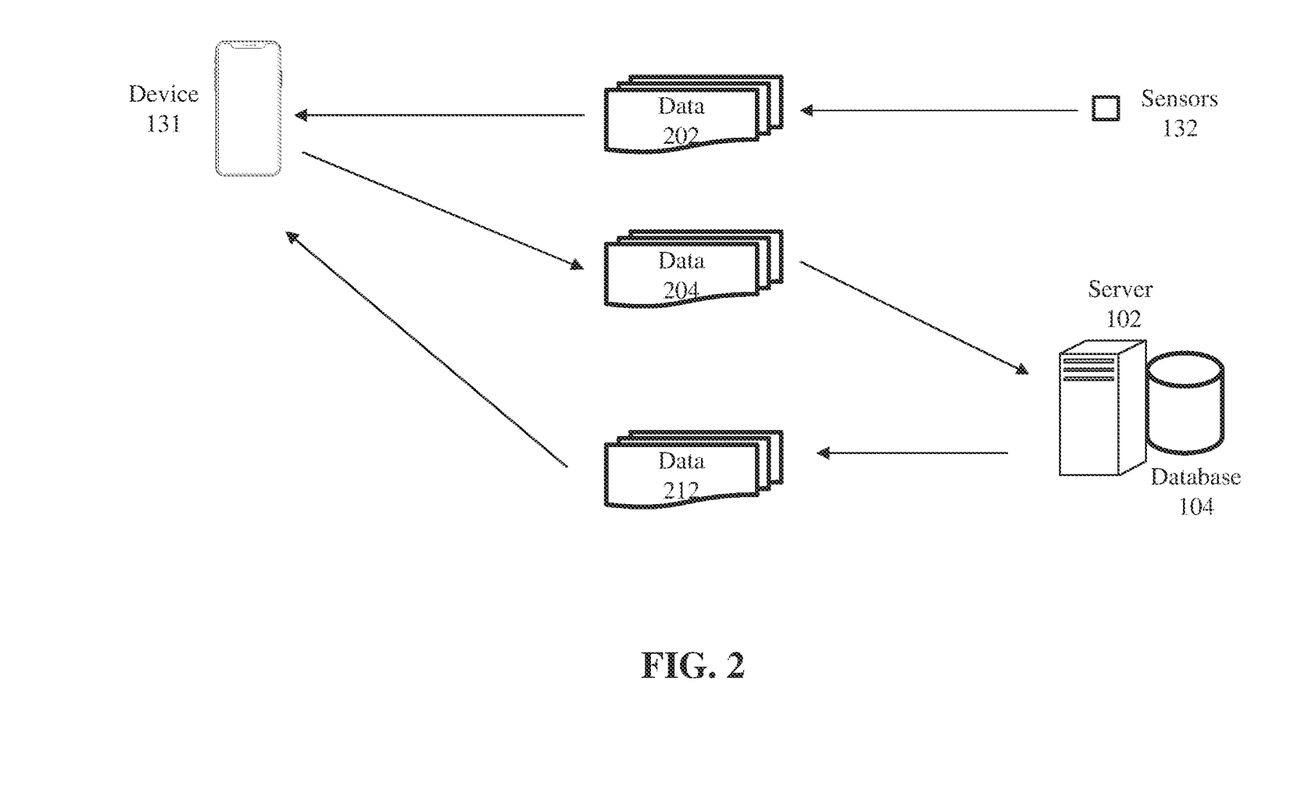
FIG. 2 is a block diagram showing the data flow of the process for facilitating virtual garment fitting over a communications network, according to one embodiment.
Figure 3:
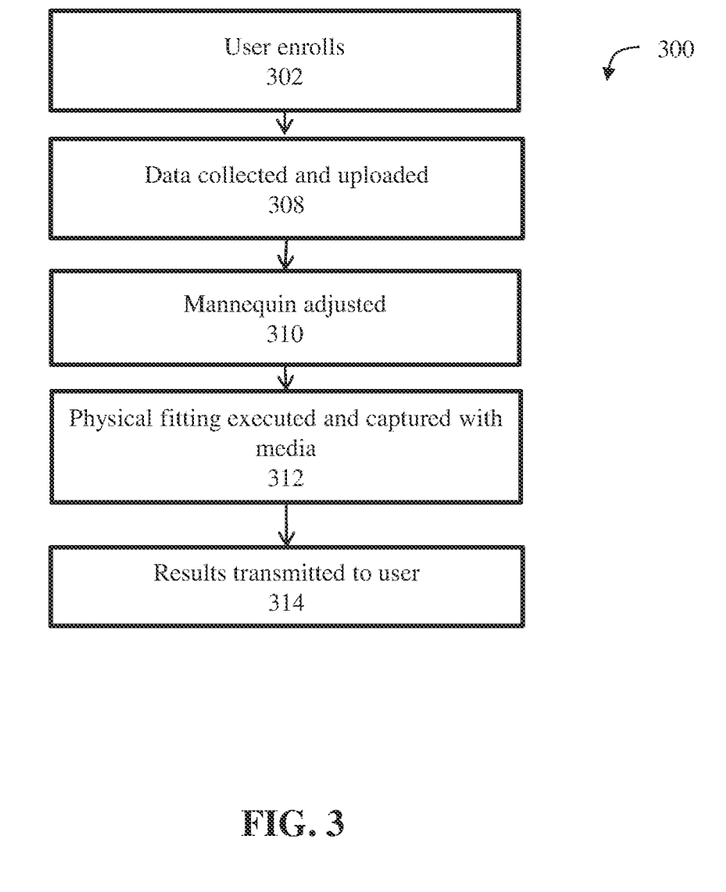
FIG. 3 is a flow chart depicting the general control flow of a process for facilitating virtual garment fitting over a communications network, according to one embodiment.

The process of facilitating virtual garment fitting over a communications network will now be described with reference to FIGS. 2-3 below. FIGS. 2-3 depict the data flow and control flow of the process for facilitating virtual garment fitting over a communications network 106, according to one embodiment. The process of the disclosed embodiments begins with optional step 302 (see flowchart 300), wherein the user 111 may enroll or register with server 102. In the course of enrolling or registering, the user 111 may enter data into his device 131 by manually entering data into a mobile application via keypad, touchpad, or via voice. In the course of enrolling or registering, the user may enter any data that may be stored in a user record, as defined above. Also in the course of enrolling or registering, the server 102 may generate a user record for each registering user and store the user record in an attached database, such as database 104.

In step 308, sensors 132 (which may be a camera, a laser scanner, a LIDAR scanner, etc.) may collect 3D data 202 about the body of user 111 and transmit a request (via data packet 204), such as an HTTP request, to server 102. Also in the step 308, the server 102 may store in database 104 the data 202 in association with one or more virtual fitting records for the virtual fitting executed by the user 111, and/or the user record for user 111. The 3D data 202 may comprises a 3D model of the user's body, which may be encapsulated in a 3D file. The 3D data 202 may further comprise a unique identifier or a description of a particular garment or garments that user 111 would like to have fitted in the virtual fitting. Sensors 132 may be peripherals communicably attached to device 131 or media capture devices integrated in device 131.

In step 310, the server 102 interfaces with the computing device 114, which, in turn, interfaces with and adjusts the adjustable, physical life-size mannequin 119 such that it emulates a life-size model of the body of user 111. In step 312, a person or machine associated with server 102 may place onto mannequin 119 a physical specimen of the particular garment or garments that user 111 would like to have fitted in the virtual fitting. I.e., in step 312, the mannequin 119 is fitted with the garment(s) selected by the user 111. In step 314, the server 102 takes a virtual fitting of the particular garment or garments on the mannequin 119. Recall a virtual fitting may comprise: i) a 3D model of a mannequin representing the user's body having the garment placed on said mannequin, ii) a video of the mannequin representing the user's body having the garment placed on said mannequin, and/or iii) an AR/VR file of the mannequin representing the user's body having the garment placed on said mannequin. Also in the step 314, the server 102 may take a video or 3D model of the mannequin 119 using the camera 115 or another media capture device associated with computer device 114. Also in the step 314, the server 102 may generate and store (or update) in database 104 one or more virtual fitting records for the virtual fitting associated with the user 111, wherein said record(s) include the virtual fitting data collected in step 314.

In 316, the server 102 may transmit the executed virtual fitting data or associated virtual fitting record, (via data packet 212) to the mobile device 131 of the user 111 via a network protocol, such as HTTP, to the IP address of the mobile device 131. Once it has received the virtual fitting data or associated virtual fitting record from the server, the client module executing on mobile computing device 131 may view the virtual fitting data or associated virtual fitting record and execute one or more actions upon said data. The client module executing on mobile computing device 131 may view the virtual fitting data or associated virtual fitting record using a VR or AR system.

Figure 4:
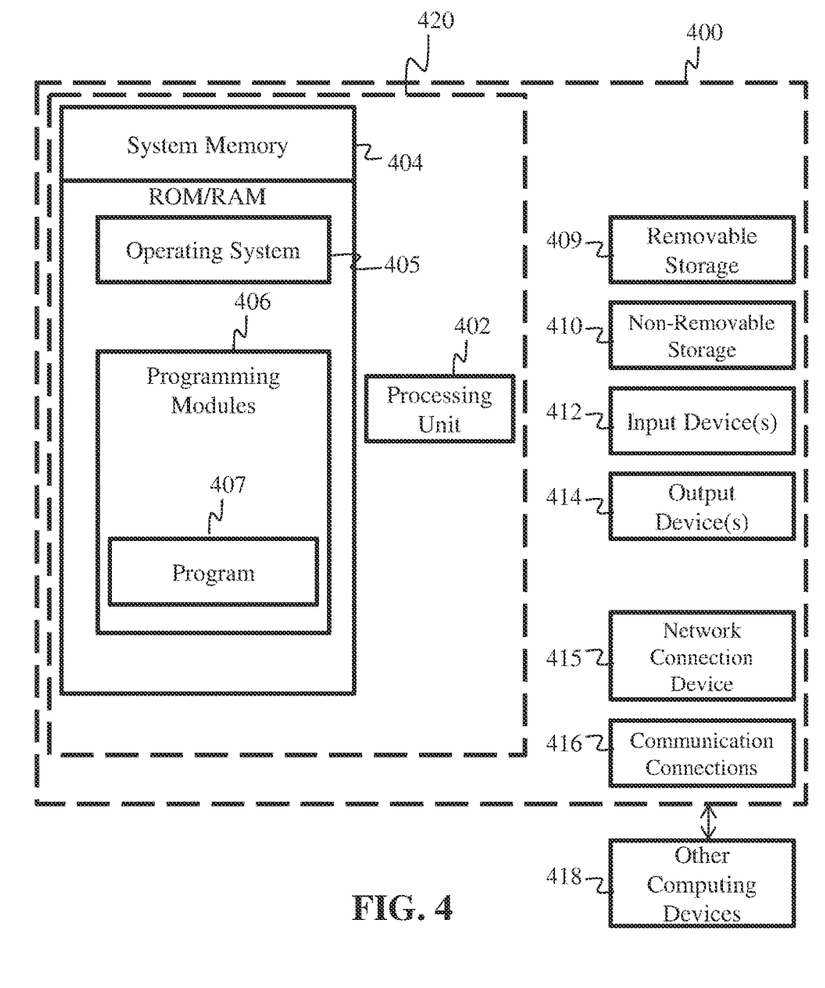
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 131, 102 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and process 300, as described above. Process 300 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 131, 102. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the process 300 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A system for facilitating virtual garment fitting, the system comprising:
   a) a client module executing on a client computing device communicably connected to a communications network, the client module configured for:
      1) executing a three-dimensional (3D) scan of a user's body, generating a first 3D model of the user's body, and transmitting the first 3D model to a web server over the communications network; and
      2) receiving and viewing a virtual fitting from the server over the communications network, wherein the virtual fitting shows a particular garment on a physical life-size model based on the 3D model; and wherein the virtual fitting comprises a second 3D model of the physical life-size model having the particular garment placed thereon;
   b) the physical life-size model being an adjustable model configured to emulate a variety of human body sizes and shapes, wherein the physical life-size model is an exoskeleton that emulates a human body;
   c) a web server module executing on the web server communicably connected to the communications network, the web server module configured for:
      1) receiving the first 3D model of the user's body over the communications network;
      2) interfacing with the physical life-size model and adjusting the physical life-size model based on the first 3D model;
      3) placing the particular garment on the physical life-size model that has been adjusted;
      4) generating a virtual fitting that shows the particular garment on the physical life-size model that has been adjusted, wherein the virtual fitting comprises the second 3D model of the physical life-size model having the particular garment placed thereon; and
      5) transmitting the virtual fitting to the client module over the communications network.

2. The system of claim 1, wherein the step of executing a 3D scan of a user's body further comprises scanning the user's body using a camera on the client computing device.

3. The system of claim 1, wherein the step of executing a 3D scan of a user's body further comprises scanning the user's body using a laser scanner coupled with the client computing device.

4. The system of claim 1, wherein the step of executing a 3D scan of a user's body further comprises scanning the user's body using a light emitting device coupled with the client computing device.

5. The system of claim 2, wherein a virtual fitting comprises a video that may be viewed on a display screen on the client computing device.

6. The system of claim 2, wherein a virtual fitting comprises a 3D model.

7. The system of claim 6, wherein the step of viewing a virtual fitting includes viewing the 3D model via the display screen on the client computing device.

8. The system of claim 7, wherein the step of viewing a virtual fitting includes interactive manipulation of the 3D model via the display screen on the client computing device.

9. The system of claim 2, wherein the physical life-size model is configured to emulate a variety of human body sizes and shapes up to 2 meters in length.

10. The system of claim 2, wherein the step of generating a virtual fitting that shows a particular garment on a physical life-size model based on the 3D model further comprises generating a video of the particular garment on the physical life-size model that was adjusted.

11. A method for facilitating virtual garment fitting, the system comprising:
1) executing, on a client module executing on a client computing device communicably connected to a communications network, a three-dimensional (3D) scan of a user's body;
2) generating, by the client module, a first 3D model of the user's body;
3) transmitting, by the client module, the first 3D model to a web server over the communications network;
4) receiving and viewing, by the client module over the communications network, a virtual fitting from the server, wherein the virtual fitting shows a particular garment on a physical life-size model based on the 3D model, and wherein the virtual fitting comprises a second 3D model of the physical life-size model having the particular garment placed thereon;
5) receiving, by a web server module executing on the web server communicably connected to the communications network, the first 3D model of the user's body;
6) interfacing, by the web server module, with an adjustable physical life-size model and adjusting the physical life-size model based on the first 3D model, wherein the physical life-size model being configured to emulate a variety of human body sizes and shapes, wherein the physical life-size model is an exoskeleton that emulates a human body;
7) placing the particular garment on the physical life-size model that has been adjusted;
8) generating, by the web server module, a virtual fitting that shows the particular garment on the physical life-size model based on the 3D model, wherein the virtual fitting comprises the second 3D model of the physical life-size model having the particular garment placed thereon; and
9) transmitting, by the web server module over the communications network, the virtual fitting to the client module.

12. The method of claim 11, wherein the step of executing a 3D scan of a user's body further comprises scanning the user's body using a camera on the client computing device.

13. The method of claim 11, wherein the step of executing a 3D scan of a user's body further comprises scanning the user's body using a laser scanner coupled with the client computing device.

14. The method of claim 11, wherein the step of executing a 3D scan of a user's body further comprises scanning the user's body using a light emitting device coupled with the client computing device.

15. The method of claim 12, wherein a virtual fitting comprises a video that may be viewed on a display screen on the client computing device.

16. The method of claim 12, wherein a virtual fitting comprises a 3D model.

17. The method of claim 16, wherein the step of viewing a virtual fitting includes viewing the 3D model via the display screen on the client computing device.

18. The method of claim 17, wherein the step of viewing a virtual fitting includes interactive manipulation of the 3D model via the display screen on the client computing device.

19. The method of claim 12, wherein the physical life-size model is configured to emulate a variety of human body sizes and shapes up to 2 meters in length.

20. The method of claim 12, wherein the step of generating a virtual fitting that shows a particular garment on a physical life-size model based on the 3D model further comprises generating a video of the particular garment on the physical life-size model that was adjusted.

* * * * *